US009793698B2

(12) United States Patent
Parsons et al.

(10) Patent No.: US 9,793,698 B2
(45) Date of Patent: Oct. 17, 2017

(54) DEADEND TERMINATION CLAMP AND COLLET

(71) Applicant: AFL Telecommunications LLC, Duncan, SC (US)

(72) Inventors: David Eric Parsons, Simpsonville, SC (US); James David Logan, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 41 days.

(21) Appl. No.: 14/768,973

(22) PCT Filed: Feb. 20, 2014

(86) PCT No.: PCT/US2014/017349
§ 371 (c)(1),
(2) Date: Aug. 19, 2015

(87) PCT Pub. No.: WO2014/130646
PCT Pub. Date: Aug. 28, 2014

(65) Prior Publication Data
US 2016/0006230 A1    Jan. 7, 2016

Related U.S. Application Data

(60) Provisional application No. 61/767,000, filed on Feb. 20, 2013.

(51) Int. Cl.
*F16L 3/08*      (2006.01)
*H02G 7/05*     (2006.01)
*F16L 3/12*      (2006.01)

(52) U.S. Cl.
CPC ............ *H02G 7/056* (2013.01); *F16L 3/1222* (2013.01)

(58) Field of Classification Search
CPC ............................. F16L 3/1222; H02G 7/056
(Continued)

(56) References Cited

U.S. PATENT DOCUMENTS 1,643,110 A     9/1927  Briggs
2,089,857 A  *  8/1937  Robbins ................ F16G 11/048
                                                              24/122.3
(Continued)

FOREIGN PATENT DOCUMENTS

DE       897865 C  * 11/1953  ............. H02G 7/056
FR     1536381 A  *  8/1968  ............. H02G 7/056

OTHER PUBLICATIONS

International Search Report for PCT/US2014/017349 dated Jun. 10, 2014.
Written Opinion for for PCT/US2014/017349 dated Jun. 10, 2014.

*Primary Examiner* — Gwendolyn W Baxter
(74) *Attorney, Agent, or Firm* — Dority & Manning, P.A.

(57) ABSTRACT

A dead-end termination clamp including a cast body, a clamping end, and a connection end. The dead-end clamp may be scaled to support various size wires or cables. The dead-end clamp may be able to provide a support strength less than, equal to, or exceeding the breaking strength of a supported cable. A collet with a length, two ends, a central cavity and at least one helical slot running along the length of the collet. The at least one helical slot may have a varying width or pitch along the length. The at least one helical slot may terminate before reaching one or both ends. The collet may have one helical slots which runs the entire length of the collet. The collet may be substantially cylindrical or another shape. The center cavity may be substantially cylindrical or another shape.

9 Claims, 6 Drawing Sheets

(58) Field of Classification Search
USPC ..... 248/74, 56, 61; 174/84 R; 403/300, 365, 403/369; 439/820
See application file for complete search history.

(56) References Cited

U.S. PATENT DOCUMENTS

| | | | |
|---|---|---|---|
| 2,282,676 A | 5/1942 | Pigott | |
| 2,338,822 A * | 1/1944 | Ruggieri | H02G 7/056 24/135 A |
| 2,463,144 A * | 3/1949 | Buchanan | H01R 4/308 279/28 |
| 3,098,275 A * | 7/1963 | Schweitzer | F16G 11/04 174/84 R |
| 3,306,970 A * | 2/1967 | Kowalski | H02G 7/056 174/79 |
| 3,374,511 A * | 3/1968 | Barker | F16G 11/04 403/369 |
| 3,879,147 A * | 4/1975 | Morell | E04C 5/122 24/115 M |
| 7,607,954 B2 | 10/2009 | Byrne et al. | |
| 8,022,301 B2 | 9/2011 | Bryant et al. | |

\* cited by examiner

DEADEND TERMINATION CLAMP AND COLLET

CROSS-REFERENCE TO RELATED APPLICATIONS

This application is based upon and claims the benefit of priority from U.S. Provisional Application No. 61/767,000, filed Feb. 20, 2013, in the United States Patent and Trademark Office, the disclosure of which is incorporated herein in its entirety by reference.

BACKGROUND

1. Field

The invention is related to clamps, and more particularly to dead-end termination clamps suitable for use with cables and collets.

2. Related Art

One of the key challenges in use of dead-end clamps is that they provide support greater than the breaking strength of the cable/wires onto which they are installed. As such, the cables/wires fail before the clamps. Further, special techniques or tools may be required to seat or engage the clamping mechanism of the clamps. In the existing art, for instance, tools are often required to engage the clamping mechanism in conventional clamps. This makes the use of the clamps unnecessarily time consuming and laborious, and introduces variables in installation technique that could lead to pre-mature product failure.

Some of the conventional technology/methodology includes:

1. All metal clamps;
2. Collets manufactured with slots placed along its length.

Supporting less than or equal to cable strength would be needed to shift the point of failure from the cable/wire to the clamp. Further, engagement of the clamping mechanism should be made without unnecessarily requiring extra force or the use of tools. The current exemplary embodiments provide a means for selecting the support strength and engaging the clamping mechanism without extraneous tools or force.

SUMMARY

Exemplary implementations of the present invention address the problems and/or disadvantages of the current technology/methodology described above. Although the present invention is not required to overcome all of the disadvantages described above, an exemplary implementation of the present invention may address the above disadvantages, and further disadvantages not described above, or may not overcome any of the problems listed above while still providing improved methodology and enhancement to the present art.

One embodiment of the present invention utilizes various castings to form the clamp. The clamp includes a clamping end and a connection end. The clamping end includes a clamping mechanism Other features of the embodiment may include the support strength of the clamp being 80% of the cable strength. Other features of the embodiment may include the support strength of the clamp being 100% of the cable strength. Other features of the embodiment may include the support strength of the clamp being between 80% and 100% of the cable strength.

Other features of the embodiment may include a tongue connection. Other features of the embodiment may include a clevis connection.

Other features of the embodiment may include scaling the castings proportionate to the size of the cable.

Other features of the embodiment may include the use of a chuck for a clamping mechanism. Other features of the embodiment may include the chuck being a collet. Other features of the embodiment may include the collet using one or more helical slots.

Another embodiment of the invention is a collet with a length and at least one helical slot running along the length. Other features of the embodiment may include varying pitch or width of the slot. Other features of the embodiment may include slots which do not run the entire length of the collet.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
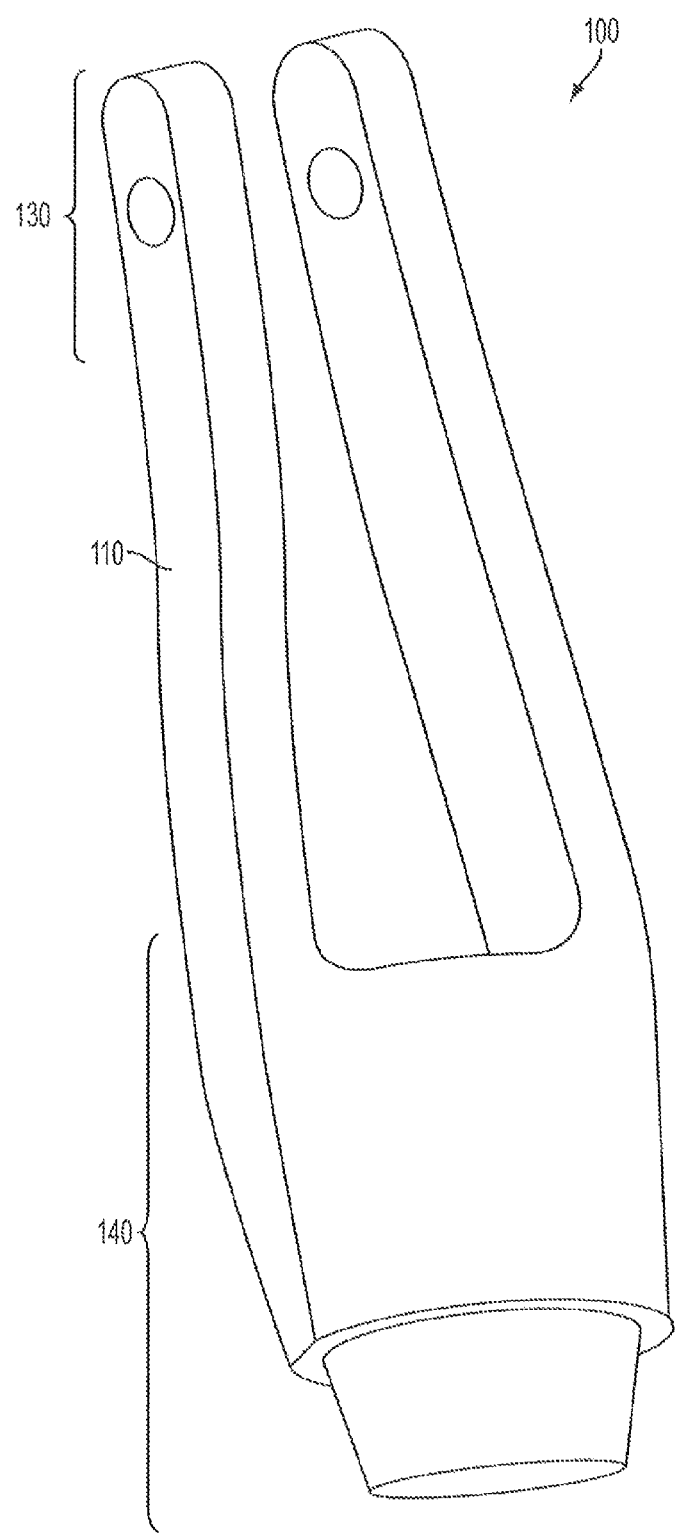
FIG. 1 shows a perspective view of an exemplary embodiment of a cast dead-end clamp.

FIG. 1 shows perspective view of an exemplary embodiment of a cast dead-end clamp 100. Some of the major components are identified. The dead-end clamp 100 includes a cast body 110, a connector end 130, and a clamping end 140. The connector end 130 utilizes a clevis-style connector as shown. The clamping end 140 secures a cable or a wire (not shown). The clamping end 140 may secure the cable or wire with a collet (not shown). Also, the dead-end clamp 100 may be scaled to proportionate to the size of a cable necessary to exceed the termination strength of the applied cable. Also, the support strength of the dead-end clamp 100 may be equal to or exceed the breaking strength of a supported cable. Alternatively, the support strength of the dead-end clamp 100 may be less than the breaking strength of a supported cable. For instance, the dead-end clamp 100 may have a support strength of about 80% of the breaking strength of a supported cable. Alternatively, the dead-end clamp 100 may have a support strength of between 80% and 100% of the breaking strength of a supported cable.

Figure 2:
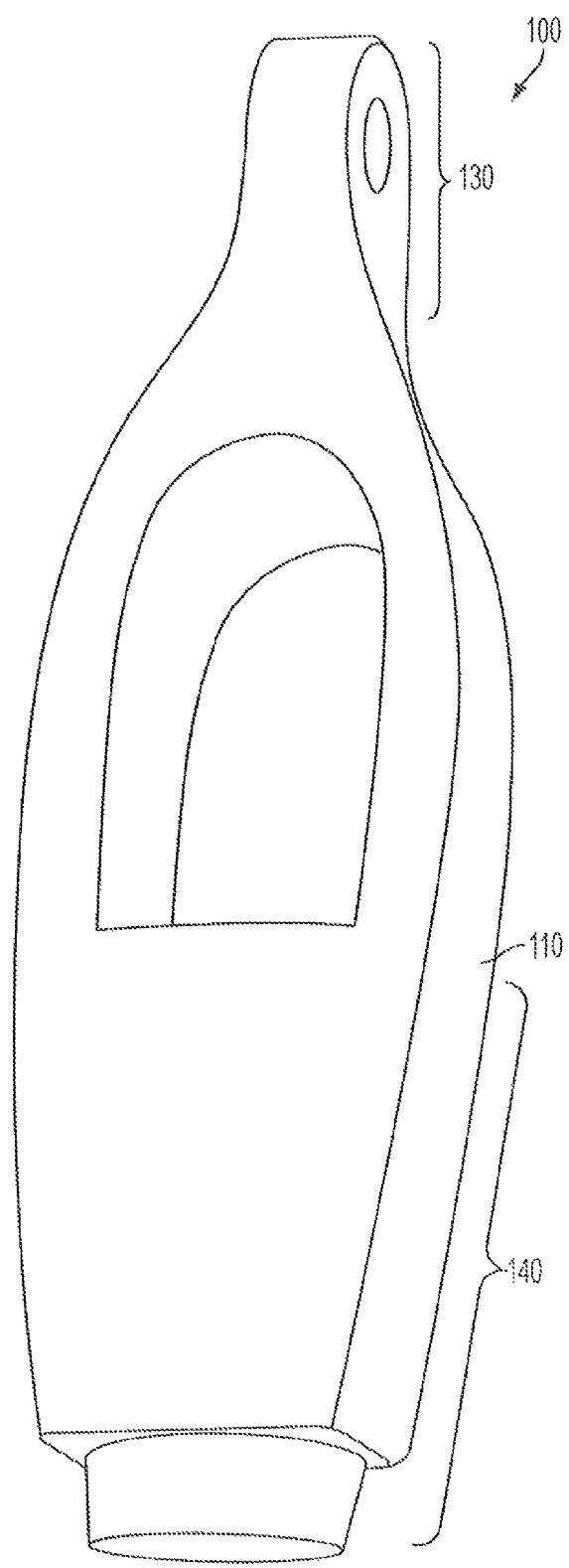
FIG. 2 shows a perspective view of an alternative exemplary embodiment of a cast dead-end clamp.

FIG. 2 shows perspective view of another exemplary embodiment of a cast dead-end clamp 100. Some of the major components are identified. The dead-end clamp 100 includes a cast body 110, an eye type connector end 130, and a clamping end 140. The eye type connector end 130 utilizes a tongue-style connector as shown. The clamping end 140 secures a cable or a wire (not shown).

Figure 3:
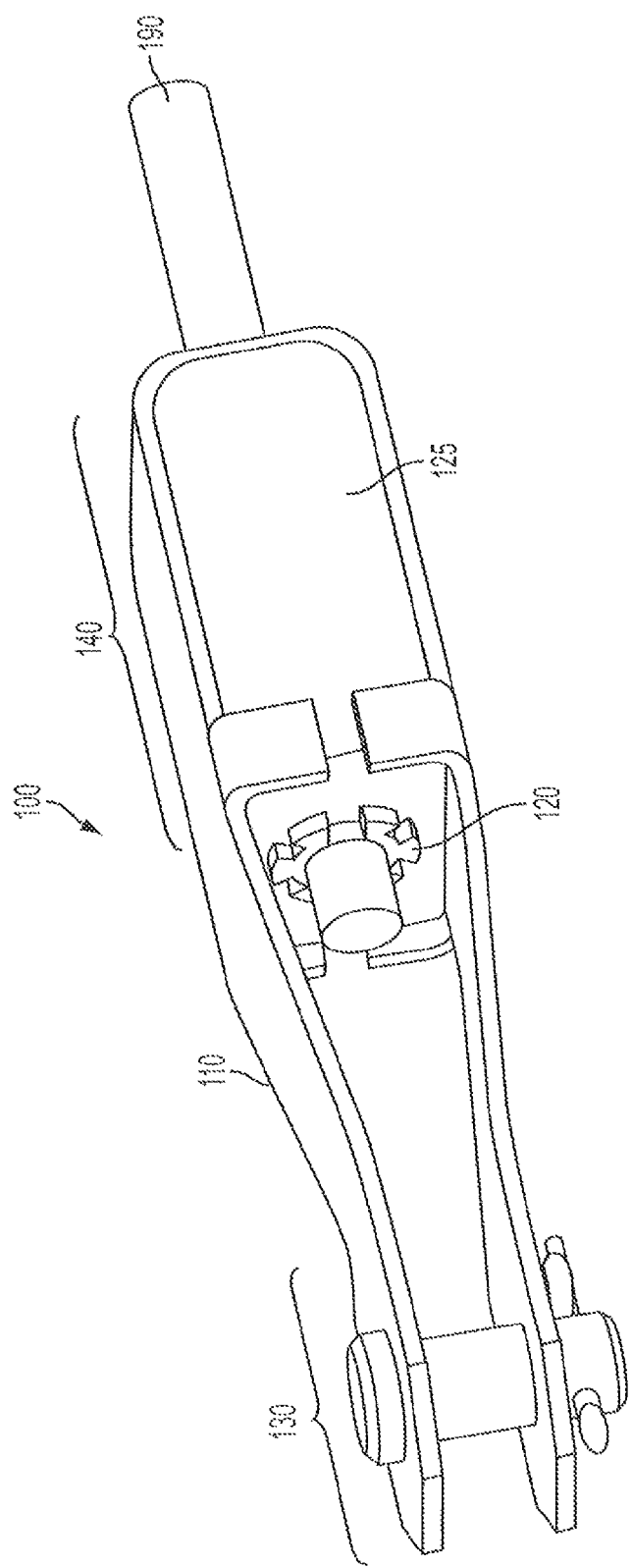
FIG. 3 shows a perspective view of an alternative exemplary embodiment of a cast dead-end clamp including formed metal straps.

FIG. 3 shows perspective view of an exemplary embodiment of a cast dead-end clamp 100. Some of the major components are identified. The dead-end clamp 100 includes a cast body 110, a connector end 130, and a clamping end 140. The connector end 130 utilizes a clevis-style connector as shown. The clamping end 140 secures a cable 190. The clamping end 140 houses a collet block 125 which holds a collet 120 to secure the cable 190.

Figure 4:
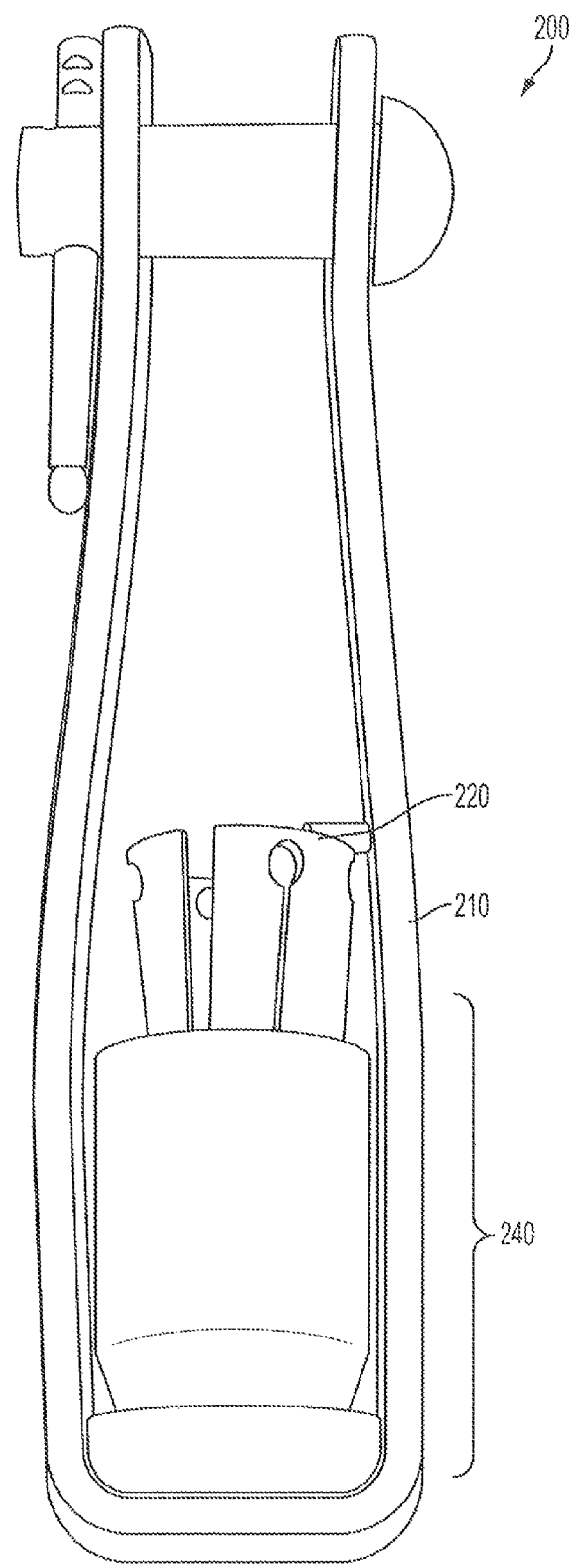
FIGS. 4 shows a perspective view of a conventional metal dead-end clamp including formed metal straps.

FIG. 4 shows perspective view of a conventional dead-end clamp 200. The dead-end clamp 100 includes a metal body 210 and clamping end 240. The metal body 210 is made of a formed stainless steel strap. The clamping end utilizes a conventional collet 220. The conventional dead-end clamp 200 has a support strength greater than the breaking strength of a supported cable (not shown). The conventional collet will be described with more detail below with reference to FIG. 6.

Figure 5:
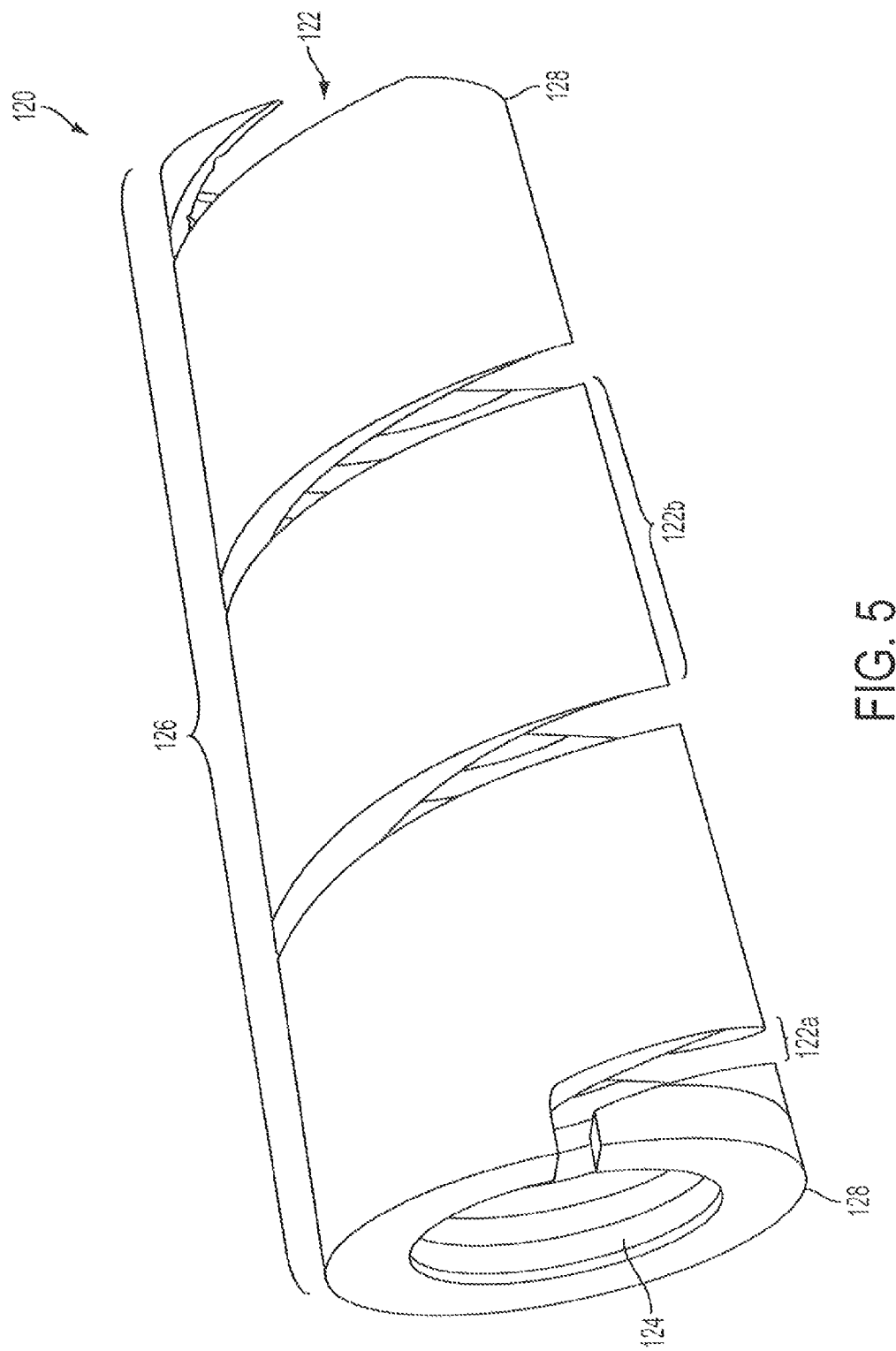
FIGS. 5 shows a perspective view of an exemplary embodiment of a collet with a helical slot.

FIG. 5 shows perspective view of an exemplary embodiment of a collet 120. The collet 120 includes a length 126, two ends 128, a center cavity 124, and a helical slot 122. The helical slot 122 runs along the length 126 of the collet 120. The helical slot 120 supports the collet 120's compression function around the center cavity 124. Various cables, wires, or other implements (not shown) may be placed in the center cavity 124 and secured by the collet 120's compression function. The helical slot has a width 122a and a pitch 122b. The pitch 122b is distance traveled along the length 126 of the collet 120 for each rotation of the helical slot 122. The width 122a of the helical slot 122 may vary along the length 126 of the collet 120 to insure maximum flexibility and compressive strength. The pitch 122b of the helical slot 122 may vary along the length 126 of the collet 120. Although only one helical slot 122 is shown, multiple helical slots (not shown) may be utilized. Although the helical slot 122 is shown to run continuously between the ends 128 of the collet 120, in other embodiments the helical slot may terminate before reaching one or both ends. Although the collet 120 is shown to be substantially cylindrical, alternative shapes may be utilized. Although the center cavity 124 is shown to be substantially cylindrical, alternative shapes may be utilized.

Figure 6:
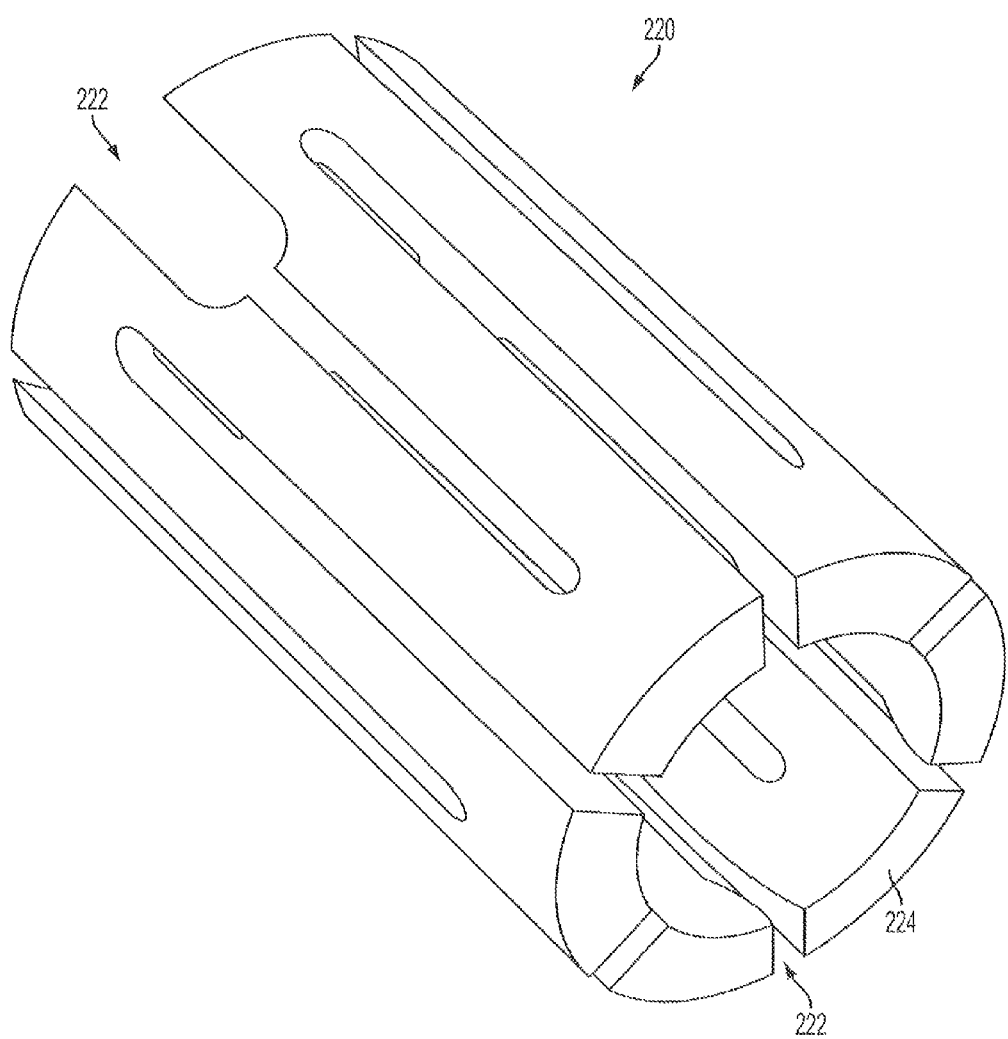
FIGS. 6 shows a perspective view of a conventional collet.

FIG. 6 shows perspective view of a conventional collet 220. The collet 220 includes several vertical slots 222 placed along its length to support the collet 220's compression function around a center 224.

Advantages and benefits of the invention may include, but are not limited to, the following:

1. New dead-end clamp design features a cast body which may be scalable to accommodate different size cables or wires.
2. New dead-end clamp design has a support strength of 80% to 100% of a supported cable's breaking strength. This allows for the failure of the clamp before the designed failure of the supported cable.
3. New dead-end clamp design may accommodate tongue or clevis connection styles.
4. New collet design features one or more helical slots along the length of the collet.
5. New collet design features one or more helical slots which may vary in pitch, width, or both along the length of the collet.
6. New collet design reduces and/or removes the requirement for force or tools for enacting the compression and engagement function of the collet.

What is claimed is:

1. A dead-end clamp for supporting a wire or cable comprising:
a cast body comprising a clamping end and a connection end; and
a collet positionable at least partially within the connection end for securing the wire or cable, the collet comprising a body extending between a first end and a second end and defining a length, the body further defining a center cavity and at toast one helical slot which runs along the length of the collet, the at least one helical slot running continuously from the first end to the second end, wherein the at least one helical slot comprises a width and a pitch.

2. The dead-end clamp of claim 1, wherein the connection end comprises a clevis.

3. The dead-end clamp of claim 1, wherein the connection end comprises a tongue.

4. The dead-end clamp of claim 1, wherein the width of the at least one helical slot varies along the length. of the collet.

5. The dead-end clamp of claim 1, wherein the pitch of the at least one helical slot varies along the length of the collet.

6. The dead-end clamp of claim 1, wherein the at least one helical slot is a plurality of helical slots.

7. The dead-end clamp of claim 1, wherein the center cavity is substantially cylindrical.

8. The dead-end clamp of claim 1, wherein the collet is substantially cylindrical.

9. The dead-end clamp of claim 1, further comprising a collet block, wherein the collet is positionable at least partially within the collet block.

\* \* \* \* \*